Sept. 25, 1951   H. B. SCHULTZ   2,569,025
MASTER CYLINDER SEALING AND COMPENSATING MEANS
Filed Dec. 7, 1946
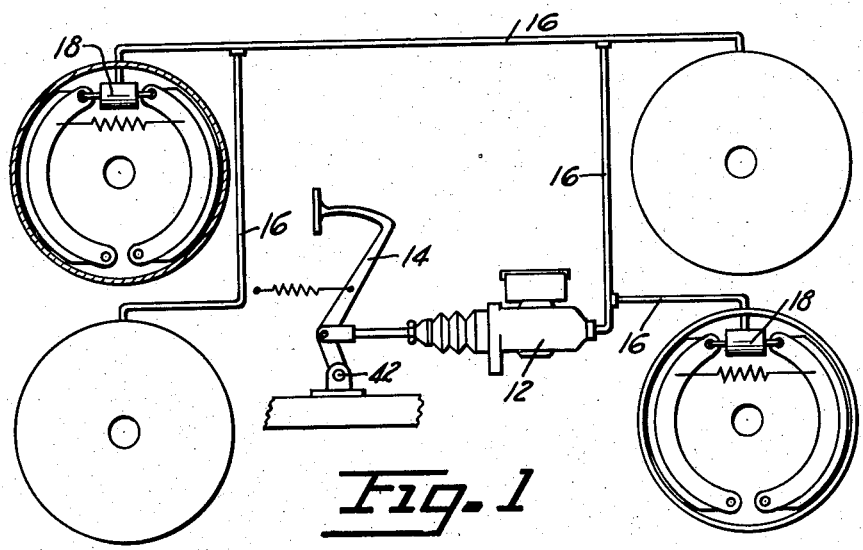
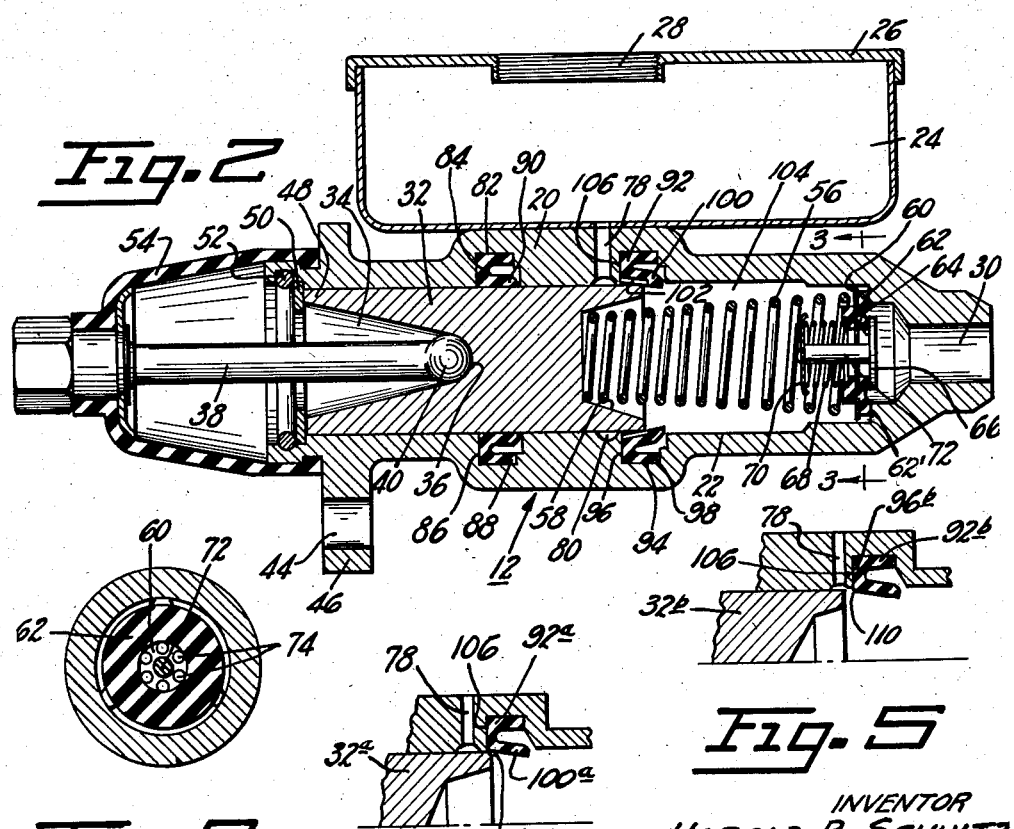
INVENTOR
HAROLD B. SCHULTZ
BY
T. J. Plante
ATTORNEY Patented Sept. 25, 1951

2,569,025

UNITED STATES PATENT OFFICE 2,569,025

MASTER CYLINDER SEALING AND COMPENSATING MEANS

Harold B. Schultz, South Bend, Ind., assignor to Bendix Aviation Corporation, South Bend, Ind., a corporation of Delaware Application December 7, 1946, Serial No. 714,701

15 Claims. (Cl. 60—54.6)

This invention relates to master cylinders for hydraulic pressure systems, such, for example, as the brake actuating systems used in conventional vehicles.

An object of the present invention is to provide an improved master cylinder construction, which will be more efficient in operation and less expensive to manufacture than master cylinders now available.

It has long been an aim of master cylinder investigation and research to reduce the danger of scuffing and destroying the lip of the forward packing member caused by movement of the lip over the compensation port. Several rather complex and costly arangements have been suggested for eliminating the rubbing action of the packing over the conventional hole in the master cylinder wall.

The present invention accomplishes this significant result and thereby insures increased life for the packing member, without increasing the complexity or cost of the master cylinder and, quite probably, with an actual decrease in cost.

Other objects and advantages of the present invention will become apparent during the following discussion, reference being had therein to the accompanying drawing, in which:

Figure 1 is a diagrammatic illustration of a fluid brake system including the improved master cylinder;

Figure 2 is a vertical section taken through the master cylinder of Figure 1, showing the piston in released, or retracted, position;

Figure 3 is a cross-section taken on the line 3—3 of Figure 2;

Figure 4 is a partial section of a master cylinder embodying a second version of the invention; and Figure 5 is a partial section of a master cylinder embodying yet another version of the invention.

Referring to Figure 1, the fluid pressure system may comprise a master cylinder 12, a manually operated pedal 14 operatively associated with the master cylinder, a fluid pressure delivery pipe 16 connected to the discharge port of the master cylinder, and a plurality of motors, or wheel cylinders, 18 which are connected to the pipe 16 and which are arranged to spread the shoes of the usual vehicle brakes.

Figure 2 shows the master cylinder 12 in section. The master cylinder comprises, in general, a body portion 20 having a cylindrical bore 22, and a reservoir portion 24. The reservoir may be formed as a drawn sheet metal member and welded to the cast body portion, as shown, or the body and reservoir may be integrally formed in a single cast member, as in conventional practice. Secured to the top of the reservoir is a cover 26, provided with a threaded opening 28 for receiving a suitable cap. The right end of the cylindrical bore 22 has a port 30 which connects the forward, or discharge, end of the bore to the pipe 16.

Reciprocable in the bore of the master cylinder is a piston 32, which preferably has a substantially uniform outer diameter throughout its length, as shown. The rearward, or left, end of the piston has a deep pocket 34 formed therein, terminating in a concave spherical bearing surface 36. Extending into the pocket 34 is a thrust rod 38, which is mechanically connected to the pedal 14, and which has a spherical end portion 40 engaging the surface 36. The rounded engaging surfaces 36 and 40 permit the outer end of rod 38 to move through the necessary arc as it actuates piston 32, the pedal lever 14 being pivoted at 42 on the vehicle structure, and the master cylinder being supported on the vehicle by means of bolts extending through openings 44 provided in the mounting flange 46.

In its retracted, or released, position, the left end 48 of the piston rests against a washer 50, which is held in position by a snap ring 52 located in a shallow groove in the master cylinder wall. A flexible rubber boot 54 encloses the left end of the master cylinder and the rod 38, to prevent the entry of dust and other extraneous matter into the cylinder.

The piston 32 is biased toward its retracted position by means of a compression spring 56, one end of which engages the bottom of an opening 58 provided in the forward end of the piston. The other end of the spring engages an inlet valve member, which consists of a metal disc 60 embedded in rubber seat-engaging material 62. The spring normally holds the rubber face of the valve member in engagement with the shoulder 62' formed in the master cylinder bore. The rubber portion 62 of the inlet valve member also incorporates a valve seat 64, against which the head 66 of a mushroom valve is urged by means of a very light spring 68 which engages a collar 70 on the stem 72 of the valve, the other end of spring 68 engaging the left side of the valve member 62. The inner edge of the metal disc 60 has only a slight clearance from the stem 72, thereby insuring against misalignment of the stem; and the inner portion of the metal disc has a plurality of apertures 74 (see Figure 3) which permits free flow of fluid through the disc.

Communication of the fluid in reservoir 24 with the fluid in bore 22 and in the rest of the system is obtained by means of a passage 78, which serves both as the "supply port" and as the "compensating port" of the master cylinder. (In customary terminology in this art, the port, or passage, located just ahead of the piston head in conventional master cylinders is termed the "compensating" port, and the port located intermediate the length of the piston, which supplies fluid to the recess between the piston head and skirt, is referred to as the "supply" port.) The passage 78 may open, as shown, into a shallow annular groove 80 which distributes the fluid around the circumference of the piston.

Spaced rearwardly from the passage 78 is an annular groove 82 provided in the wall of the cylinder bore. A packing ring 84, which is U-shaped in cross-section, is mounted in the groove. The base 86 of the packing ring lies against the rear surface of the groove, and the two lips 88 and 90 lie against the outer wall of the groove and the piston, respectively. The packing ring 84 prevents fluid from leaving the master cylinder via the rear end of the bore.

A second packing ring 92 is mounted in a groove 94, located ahead of the passage 78. The packing ring 92, which is also U-shaped in cross-section, has a base portion 96 resting against the rear wall of the groove and an outer lip 98 lying against the outer wall of the groove. The inner lip 100 extends just ahead of the piston when the latter is in its retracted position, as shown. The side of the packing ring 92 nearest the piston may be provided, as shown, with a plurality of axially extending grooves 102 which terminate just back of the forward edge of the inner lip. When the piston is in its retracted position these grooves permit communication between the passage 78 and the chamber 104 ahead of the piston. Although the clearance between the piston and the land 106 is made very slight in order to prevent extrusion of packing ring 92 into the clearance when under pressure, flow of fluid past land 106 is nevertheless sufficient for supply and compensation purposes.

When the forward end of the piston moves beyond the grooves 102 in the side of packing ring 92, the forward edge of lip 100 seals against the piston and prevents flow of fluid from pressure chamber 104 toward the rear of the cylinder. During the return stroke of the piston, if a vacuum is momentarily obtained in chamber 104, the grooves 102 facilitate supply of fluid from passage 78 to chamber 104, the lip 100 permitting fluid flow in this direction.

Although the mode of operation of the master cylinder should be apparent from the foregoing description, a brief summary is in order. When the operator presses on the pedal 14, thrust rod 38 is moved toward the right, forcing piston 32 to move forwardly. As soon as the piston cuts off the grooves 102, the lip 100 seals chamber 104, and fluid under pressure is displaced through port 30 and pipe 16 to the wheel cylinders 18. In moving from chamber 104 to pipe 16, the fluid lifts mushroom valve 66 from its seat against the light resistance of spring 68. As the pressure in the brake lines is increased the wheel brakes are applied proportionately.

When the operator releases the pedal, spring 56 returns piston 32 to released position, and the brake return springs push fluid from the wheel cylinders back toward the master cylinder. In returning to the master cylinder, the fluid must unseat valve 62, inasmuch as valve 66 is held seated under pressure. In order to lift valve 62, the fluid pressure has to overcome spring 56, which is much stronger than spring 68. A positive, super-atmospheric pressure is thus retained in the fluid lines during the return stroke, thereby insuring against leakage of air into the wheel cylinders.

If, during the return stroke of piston 32, a vacuum is momentarily developed in chamber 104, fluid will be drawn from reservoir 24, through passage 78, past land 106, through grooves 102, and past the edge of lip 100, into chamber 104 to supply the required fluid. When the piston reaches its released position, any oversupply of fluid will return to the reservoir through the uncovered grooves 102.

Figure 4 shows a modified arrangement of the piston and the forward packing ring of the master cylinder. In this arrangement, the inner side of packing ring 92a is not grooved, as in Figure 2. Instead the forward outer edge of the piston 32a in retracted position is located just ahead of the land 106, and is spaced from the inner side of the packing ring 92a. As soon as the piston moves forwardly far enough to engage the lower part of lip 100a, at approximately the point 108, the fluid in chamber 104 is cut off from communication with passage 78, and pressure is developed in the system. In all other respects the construction and operation are the same as in the case of the master cylinder of Figure 2.

Figure 5 shows another modified arrangement of the piston and the forward packing ring of the master cylinder. This arrangement is similar to that of Figure 4, except that the piston 32b in retracted position partially uncovers the lower end of passage 78, and the inner edge 110 of the base 96b of packing ring 92b is flush with the inner edge of land 106, thereby permitting the piston to engage the packing ring as soon as it passes the land.

Although certain particular embodiments of my invention have been decribed, it will be understood by those skilled in the art that the objects of the invention may be attained by the use of constructions different in certain respects from those disclosed without departing from the underlying principles of the invention. I therefore desire by the following claims to include within the scope of my invention all such variations and modifications by which substantially the results of my invention may be obtained through the use of substantially the same or equivalent means.

I claim:

1. A master cylinder, for use in a hydraulic pressure system, comprising a cylindrical bore, a piston reciprocable in said bore having a substantially uniform outer diameter throughout its length and having a pocket formed in its rearward surface, an actuating rod extending into said pocket to engage the innermost surface thereof, means for limiting the retractile movement of the piston, a reservoir, a passage connecting the reservoir to the cylindrical bore at a point intermediate the forward and rearward surfaces of the piston, an annular groove in the cylindrical bore which communicates directly with the passage, a fixed packing ring carried in a groove in the wall of the cylindrical bore and located behind the aforementioned passage, said packing ring having a circular lip lying against the outer surface of the piston, and a second fixed packing ring carried in a groove in the wall of the cylindrical bore and located ahead of the passage, said second packing ring having a flat base portion engaging the rear wall of the groove and a radially-inner forwardly-extending lip located just ahead of the front of the piston when the latter is in retracted position and arranged to engage the piston during its pressure stroke, said second packing ring having a plurality of axially extending grooves in the surface nearest the piston to facilitate forward flow of liquid past the piston and provide communication between the aforementioned passage and the cylindrical bore ahead of the piston when the latter is in its retracted position.

2. A master cylinder, for use in a hydraulic pressure system, comprising a cylindrical bore, a piston reciprocable in said bore having a substantially uniform outer diameter throughout its length and having a rod-receiving pocket formed in its rearward surface, means for limiting the retractile movement of the piston, a reservoir, a passage connecting the reservoir to the cylindrical bore at a point intermediate the forward and rearward surfaces of the piston, a fixed packing ring carried in a groove in the wall of the cylindrical bore and located behind the aforementioned passage, said packing ring having a circular lip lying against the outer surface of the piston, and a second fixed packing ring carried in a groove in the wall of the cylindrical bore and located ahead of the passage, said second packing ring having a flat base portion engaging the rear wall of the groove and a radially-inner forwardly-extending lip located just ahead of the front of the piston when the latter is in retracted position and arranged to engage the piston during its pressure stroke, said second packing ring having a plurality of axially extending grooves in the surface nearest the piston to facilitate forward flow of liquid past the piston and provide communication between the aforementioned passage and the cylindrical bore ahead of the piston when the latter is in its retracted position.

3. A master cylinder, for use in a hydraulic pressure system, comprising a cylindrical bore, a piston reciprocable in said bore having a substantially uniform outer diameter throughout its length and having a rod-receiving pocket formed in its rearward surface, means for limiting the retractile movement of the piston, a reservoir, a passage connecting the reservoir to the cylindrical bore at a point intermediate the forward and rearward surfaces of the piston, a fixed packing ring carried in a groove in the wall of the cylindrical bore and located behind the aforementioned passage, said packing ring having a circular lip lying against the outer surface of the piston, and a second fixed packing ring carried in a groove in the wall of the cylindrical bore and located ahead of the passage, said second packing ring having a flat base portion engaging the rear wall of the groove and a radially-inner forwardly-extending lip located just ahead of the front of the piston when the latter is in retracted position and arranged to engage the piston during its pressure stroke, said second packing ring having one or more grooves in the surface nearest the piston to provide communication between the aforementioned passage and the cylindrical bore ahead of the piston when the latter is in its retracted position.

4. A master cylinder comprising a cylindrical bore, a piston reciprocable in said bore having a substantially uniform outer diameter throughout its length, means for limiting the retractile movement of the piston, a reservoir, a passage connecting the reservoir to the cylindrical bore at a point intermediate the forward and rearward surfaces of the piston, a fixed packing ring carried in a groove in the wall of the cylindrical bore and located behind the aforementioned passage, said packing ring having a lip lying against the outer surface of the piston, and a second fixed packing ring carried in a groove in the wall of the cylindrical bore and located ahead of the passage, said second packing ring having a base portion engaging the rear wall of the groove and a forwardly-extending lip located just ahead of the front of the piston when the latter is in retracted position and arranged to engage the piston during its pressure stroke, said second packing ring having one or more grooves in the surface nearest the piston to provide communication between the aforementioned passage and the cylindrical bore ahead of the piston when the latter is in its retracted position.

5. A master cylinder comprising a cylindrical bore, a piston reciprocable in said bore having a substantially uniform outer diameter throughout its length, means for limiting the retractile movement of the piston, a reservoir, a passage connecting the reservoir to the cylindrical bore at a point intermediate the forward and rearward surfaces of the piston, a packing ring located behind the aforementioned passage, and a second packing ring carried in a groove in the wall of the cylindrical bore and located ahead of the passage, said second packing ring having a base portion engaging the rear wall of the groove and a forwardly-extending lip located just ahead of the front of the piston when the latter is in retracted position and arranged to engage the piston during its pressure stroke, said second packing ring having one or more grooves in the surface nearest the piston to provide communication between the aforementioned passage and the cylindrical bore ahead of the piston when the latter is in its retracted position.

6. A master cylinder comprising a cylindrical bore, a piston reciprocable in said bore having a substantially uniform outer diameter throughout its length, means for limiting the retractile movement of the piston, a reservoir, a passage connecting the reservoir to the cylindrical bore at a point intermediate the forward and rearward surfaces of the piston, a fixed packing ring carried in a groove in the wall of the cylindrical bore and located behind the aforementioned passage, said packing ring having a lip lying against the outer surface of the piston, and a second fixed packing ring carried in a groove in the wall of the cylindrical bore and located ahead of the passage, said second packing ring having a base portion engaging the rear wall of the groove and a forwardly-extending lip which extends ahead of the front of the piston when the latter is in retracted position and arranged to engage the piston during its pressure stroke.

7. A master cylinder comprising a cylindrical bore, a piston reciprocable in said bore having a substantially uniform outer diameter throughout its length, means for limiting the retractile movement of the piston, a reservoir, a passage connecting the reservoir to the cylindrical bore at a point intermediate the forward and rearward surfaces of the piston, a packing ring located behind the aforementioned passage, and a second packing ring carried in a groove in the wall of the cylindrical bore and located ahead of the passage, said second packing ring having a base portion engaging the rear wall of the groove and a forwardly-extending lip which extends just ahead of the front of the piston when the latter is in retracted position and arranged to engage the piston during its pressure stroke.

8. A master cylinder comprising a cylindrical bore, a piston reciprocable in said bore having a substantially uniform outer diameter throughout its length, a reservoir, a passage connecting the reservoir to the cylindrical bore at a point intermediate the forward and rearward surfaces of the piston, a packing ring carried in a groove in the wall of the cylindrical bore and located behind the aforementioned passage, said packing ring having a lip lying against the outer surface of the piston, and a second packing ring carried in a groove in the wall of the cylindrical bore and located ahead of the passage, said second packing ring having a base portion engaging the rear wall of the groove and a forwardly-extending lip which extends just ahead of the front of the piston when the latter is in retracted position and arranged to engage the piston during its pressure stroke.

9. A master cylinder comprising a cylindrical bore, a piston reciprocable in said bore having a substantially uniform outer diameter throughout its length, a reservoir, a passage connecting the reservoir to the cylindrical bore at a point intermediate the forward and rearward surfaces of the piston, a packing ring located behind the aforementioned passage, and a second packing ring carried in a groove in the wall of the cylindrical bore and located ahead of the passage, said second packing ring having a base portion engaging the rear wall of the groove and a forwardly-extending lip which extends just ahead of the front of the piston when the latter is in retracted position and arranged to engage the piston during its pressure stroke.

10. A master cylinder comprising a cylindrical bore, a piston reciprocable in said bore having a substantially uniform outer diameter throughout its length, a reservoir, a passage connecting the reservoir to the cylindrical bore, a packing ring carried in a groove in the wall of the cylindrical bore and located behind the aforementioned passage, said packing ring having a lip lying against the outer surface of the piston, and a second packing ring carried in a groove in the wall of the cylindrical bore and located ahead of the passage, said second packing ring having a base portion engaging the rear wall of the groove and a forwardly-extending lip which extends just ahead of the front of the piston when the latter is in retracted position and arranged to engage the piston during its pressure stroke.

11. A master cylinder comprising a cylindrical bore, a piston reciprocable in said bore having a substantially uniform outer diameter throughout its length, a reservoir, a passage connecting the reservoir to the cylindrical bore, a packing ring located behind the aforementioned passage, and a second packing ring carried in a groove in the wall of the cylindrical bore and located ahead of the passage, said second packing ring having a base portion engaging the rear wall of the groove and a forwardly-extending lip which extends just ahead of the front of the piston when the latter is in retracted position and arranged to engage the piston during its pressure stroke.

12. A master cylinder having a bore therein, a piston reciprocable in said bore having a substantially uniform diameter throughout its length, a reservoir connected to the bore by means of a passage, a packing ring located in a groove in the wall of the bore behind the passage, and a second packing ring located in a groove in the wall of the bore ahead of the passage, said second packing ring having a lip which extends just ahead of the front of the piston when the latter is in retracted position and which engages the piston during its pressure stroke.

13. A master cylinder having a bore therein, a piston reciprocable in said bore having a substantially uniform diameter throughout its length, a reservoir connected to the bore by means of a passage, a packing ring located behind the passage, and a second packing ring located in a groove in the wall of the bore ahead of the passage, said second packing ring having a lip which extends just ahead of the front of the piston when the latter is in retracted position and which engages the piston during its pressure stroke.

14. A master cylinder having a bore therein, a piston reciprocable in said bore, a reservoir connected to the bore by means of a passage, a packing ring located in a groove in the wall of the bore behind the passage, and a second packing ring located in a groove in the wall of the bore ahead of the passage, said second packing ring having a lip which extends just ahead of the front of the piston when the latter is in retracted position and which engages the piston during its pressure stroke.

15. A master cylinder having a bore therein, a piston reciprocable in said bore, a reservoir connected to the bore by means of a passage, a packing ring located behind the passage, and a second packing ring located in a groove in the wall of the bore ahead of the passage, said second packing ring having a lip which extends just ahead of the front of the piston when the latter is in retracted position and which engages the piston during its pressure stroke.

HAROLD B. SCHULTZ.

REFERENCES CITED

The following references are of record in the file of this patent:

UNITED STATES PATENTS

| Number | Name | Date |
|---|---|---|
| 1,841,354 | Bowen | Jan. 19, 1932 |
| 2,018,912 | Carroll | Oct. 29, 1935 |
| 2,060,854 | Carroll | Nov. 17, 1936 |
| 2,078,209 | Sanford | Apr. 20, 1937 |
| 2,175,447 | Rike | Oct. 10, 1939 |
| 2,190,257 | Clench | Feb. 13, 1940 |
| 2,410,169 | LaBrie | Oct. 29, 1946 |

FOREIGN PATENTS

| Number | Country | Date |
|---|---|---|
| 444,781 | Great Britain | Mar. 27, 1936 |
| 533,224 | Great Britain | Feb. 10, 1941 |
| 544,669 | Great Britain | Apr. 22, 1942 |